J. W. TAYLOR.
CONVERTIBLE HARROW AND DRAG.
APPLICATION FILED DEC. 2, 1920.

1,395,459.

Patented Nov. 1, 1921.

Witness:
R. L. Hamilton

Inventor
J. W. Taylor
By Thorpe & Girard
Attorneys

UNITED STATES PATENT OFFICE.

JOHN W. TAYLOR, OF EDWARDSVILLE, KANSAS.

CONVERTIBLE HARROW AND DRAG.

1,395,459.  Specification of Letters Patent.  Patented Nov. 1, 1921.

Application filed December 2, 1920. Serial No. 427,751.

*To all whom it may concern:*

Be it known that I, JOHN W. TAYLOR, citizen of the United States, and resident of Edwardsville, county of Wyandotte, State of Kansas, have invented a certain new and useful Improvement in Convertible Harrows and Drags, of which the following is a complete specification.

This invention relates to a convertible harrow and drag and has for its object to produce an agricultural implement of this character which may be easily and quickly adjusted for use as a harrow, as a drag, or as a combined harrow and drag, depending upon the condition of the soil.

With this object in view and others as may hereinafter appear, my object is to produce an implement of this character of simple, strong, durable, efficient and inexpensive construction; and in order that it may be fully understood reference is to be had to the accompanying drawing, in which:—

Figure 1:
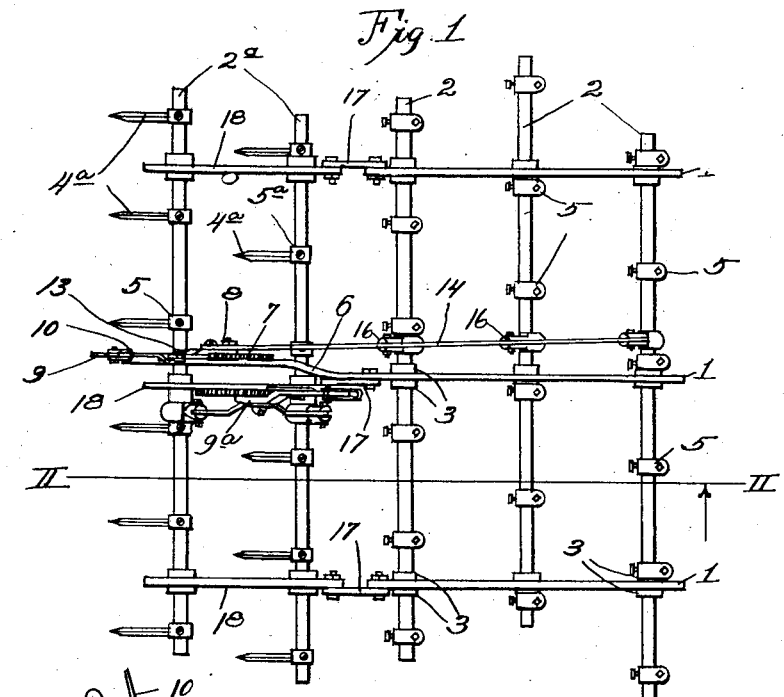
Figure 1 is a top plan view of the invention as it will appear when forming a combined harrow and drag.

In the said drawing, 1 indicates the main frame members of the device, being transversely connected together by cross bars 2 journaled in the frame members and provided at opposite sides of each frame member with fixed bearing sleeves 3 to prevent longitudinal movement of the cross bars. It will be noted that the teeth 4 and the U-shaped clamp bolts 5 for fastening the teeth to the cross bars of the harrow are of ordinary, common and well-known type and construction, but it will be understood that the special type of teeth is immaterial, as any suitable teeth may be employed. It will be noted that in the implement, as illustrated, the central frame member is bowed upwardly and preferably bent laterally as at 6, near its rear end, and then continues horizontally rearward to accommodate the auxiliary section of the implement when in its elevated position for harrowing, as hereinafter explained.

Securely fastened to the portion 6 near its rear extremity is a toothed sector 7, and pivotally connected to the said portion 6 below the sector by means of a bolt 8, is a hand lever 9, provided with a pivoted grip portion 10, a pivoted link 11 and a dog 12 for engaging the teeth of the sector, the dog being caused to engage the teeth under the action of a retractile spring 13, as customary in latch mechanisms of this type.

Figure 2:
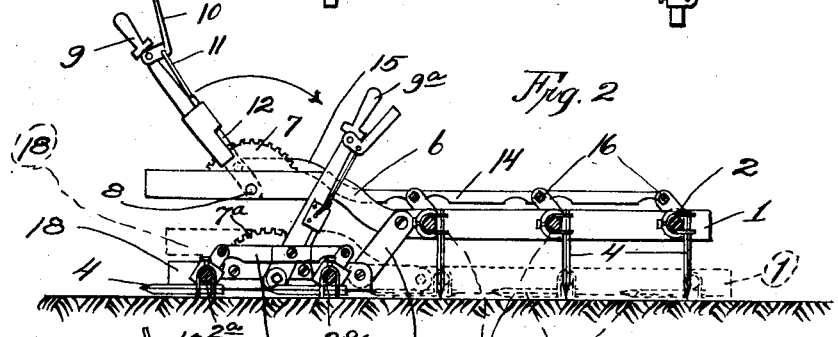
Fig. 2 is a section on the line II—II of Fig. 1, showing in full lines, the position the teeth of the harrow will occupy when the device is used as a combined harrow and drag, and in dotted lines the positions occupied when the device is used as a drag alone.
Figure 3:
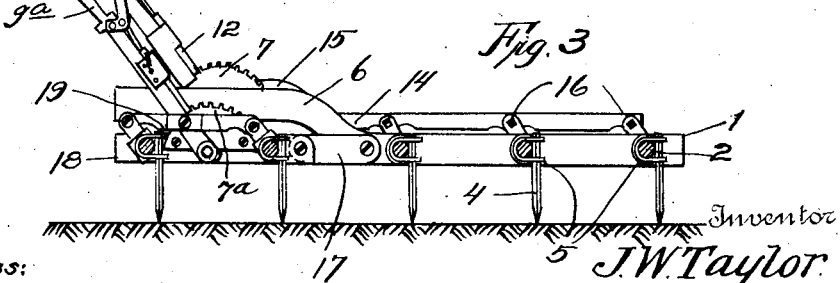
Fig. 3, is a section on the same line as that of Fig. 2, but showing the device in use as a harrow alone.

Pivoted to and near the lower end of the lever 9, is a link 14, the rear portion thereof being arched as at 15 to substantially correspond with the central frame member 1, the body portion of the link overlying the cross bars 2 of the harrow and having pivotal connection therewith by means of cranks 16 parallel to lever 9, the parts being so proportioned that the teeth of the device will be caused to assume upright positions shown in full lines in Fig. 2, when the lever occupies its rearward adjustment and to occupy horizontal positions as shown in dotted lines in the same figure, when the hand lever is swung forwardly, as indicated by the arrow in said figure, and thus permit the cross bars and frame members to move downwardly into contact with the surface of the ground, the former acting as the drag when the implement is moved across a field.

At the rear ends of the main frame members 1 and at the lower bend in the central frame member 1, are pivoted links 17 having a pivotal connection at their opposite ends with auxiliary frame members 18, provided with the cross bars, bearing sleeves and teeth as hereinbefore mentioned with respect to the main frame members 1, and bear the same reference characters with the suffix a.

Secured to the central auxiliary frame member 18, in the implement as illustrated, is a lever-operated link 19 for effecting simultaneous turning movements of cross bars $2^a$. The central frame member 18 carries a toothed sector $7^a$ for coöperative engagement with the lever $9^a$, equipped with a latch mechanism corresponding in all respects to the latch mechanism described in connection with the lever 9, it being noted that the lever $9^a$ is mounted on the central auxiliary frame member 18, and is pivoted to a link 19, which has pivotal connections with the cranks of the cross-bars as hereinbefore explained.

It will be noted by reference to Fig. 2, that when the hand lever 9ª is thrown forward, the teeth 4 of the auxiliary section of the implement will assume their horizontal positions through the action of the pivoted link and that the links 17, connecting the frame members are of sufficient length to allow the auxiliary member of the device to rest on the ground, the cross-bars forming a drag, and that the engagement of the dog with the sector will prevent the teeth from assuming their vertical positions, without manual operation of the hand lever.

The operation of the implement will be such that by manual adjustment of the hand levers, the device may be used as a harrow, as a drag, or as a combined harrow and drag. It will be understood that the pivoted link connection of the auxiliary member of the implement to the main member permits the rear section of the device to follow all convolutions in the surface of the ground. With the construction of this implement, when used as a combined harrow and drag, it will be found that the harrow portion of the implement is provided with sufficient teeth to efficiently and completely harrow the field and also that the drag portion of the implement will be sufficiently heavy and of sufficient area to perform its work satisfactorily. When the ground is in suitable condition a field may be properly harrowed and dragged in a single operation, thus saving much time and labor.

From the above description it will be apparent that I have produced an implement of the character set forth which possesses all the features of advantage pointed out as desirable, and while I have described and illustrated the preferred embodiment of the invention I reserve the right to make all changes within the spirit and scope of the appended claims.

I claim:

1. The combination of a harrow, an auxiliary section pivoted thereto, and means whereby the auxiliary section may be lowered to act as a drag on the surface of the ground.

2. The combination of a harrow, auxiliary sections pivoted thereto, and means whereby either of said sections may be adjusted to act as a drag on the surface of the ground.

3. In a convertible machine of the character described, a plurality of main and auxiliary frame longitudinal members, one having a raised extension at its rear end, transverse bars carried by said frame members, links pivotally connecting the auxiliary members with the main frame members, transverse rocker bars journaled in said auxiliary frame members, harrow teeth carried by said last-named rocker bars, lever actuated means for rocking the last-named rocker bars and lowering the auxiliary frame members, and latch mechanism for securing said frame members in either elevated or lowered position.

4. In a convertible machine of the character described, a plurality of main and auxiliary frame longitudinal members, one having a raised extension at its rear end, transverse rocker bars carried by said frame members, links pivotally connecting the auxiliary members with the main frame members, transverse rocker bars journaled in said auxiliary frame members, lever actuated means for rocking said bars to lower said frame members to the ground or to elevate them, means for securing the lever-actuated means with said frame members in their elevated or lowered position.

In testimony whereof I hereunto affix my signature.

JOHN W. TAYLOR.